United States Patent [19]

Foster

[11] Patent Number: 4,852,258
[45] Date of Patent: Aug. 1, 1989

[54] APPARATUS FOR CUTTING VEGETATION

[75] Inventor: Gary H. Foster, Houston, Tex.

[73] Assignee: White Consolidated Industries, Inc., Cleveland, Ohio

[21] Appl. No.: 631,000

[22] Filed: Jul. 16, 1984

Related U.S. Application Data

[63] Continuation of Ser. No. 245,459, Mar. 19, 1981, abandoned, which is a continuation of Ser. No. 891,666, Mar. 30, 1978, abandoned.

[51] Int. Cl.$^4$ ............................................. A01D 55/18
[52] U.S. Cl. ......................................... 30/276; 30/347
[58] Field of Search ................................. 30/276, 347

[56] References Cited

U.S. PATENT DOCUMENTS 4,138,8109 2/1979 Pittinger, Sr. et al. ............... 30/276
3,928,911 12/1975 Pittinger, Jr. .......................... 30/276
4,035,915 7/1977 Pittinger ................................ 30/347
4,104,796 8/1978 Sheldon ................................. 30/276

Primary Examiner—Frank T. Yost
Assistant Examiner—Michael D. Folkerts
Attorney, Agent, or Firm—Hubbard, Thurman, Turner & Tucker

[57] ABSTRACT

Apparatus for cutting vegetation with a rotatable head carrying a non-metallic cutting line extended into a cutting plane. Additional line is extended from a supply line coil within the head into the cutting plane without independent operation action. A mechanism in the head feeds a certain incremental length of line whenever the free end of the cutting line is reduced to this length by wear, or otherwise. After the cutting line length is extended to its original preset length, the cutting line is secured automatically against further extension from the head. The incremental line feeder mechanism is actuated by sensing an operating condition of the head, e.g., angular velocity of rotation.

27 Claims, 4 Drawing Sheets

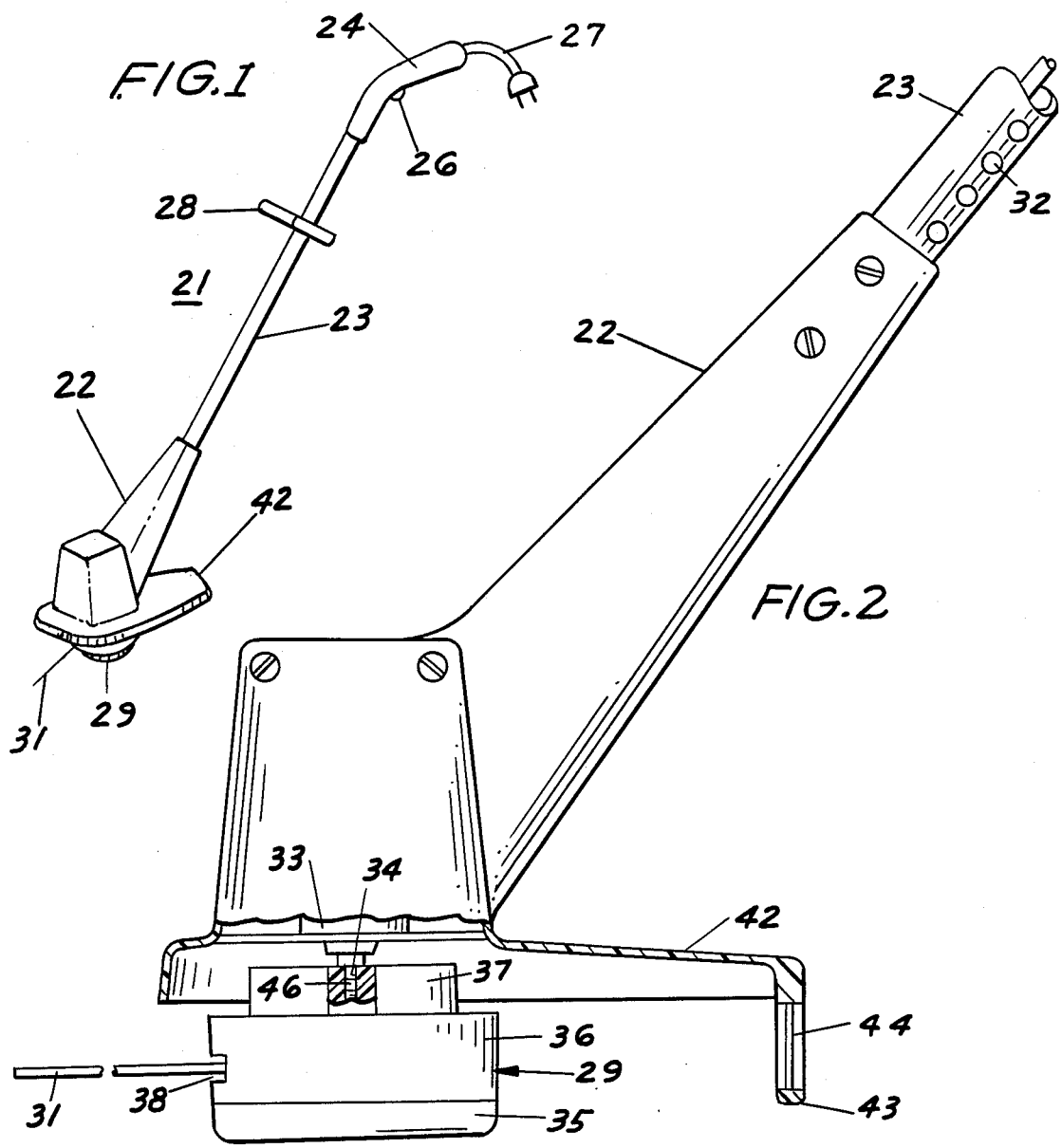
FIG.1
FIG.2
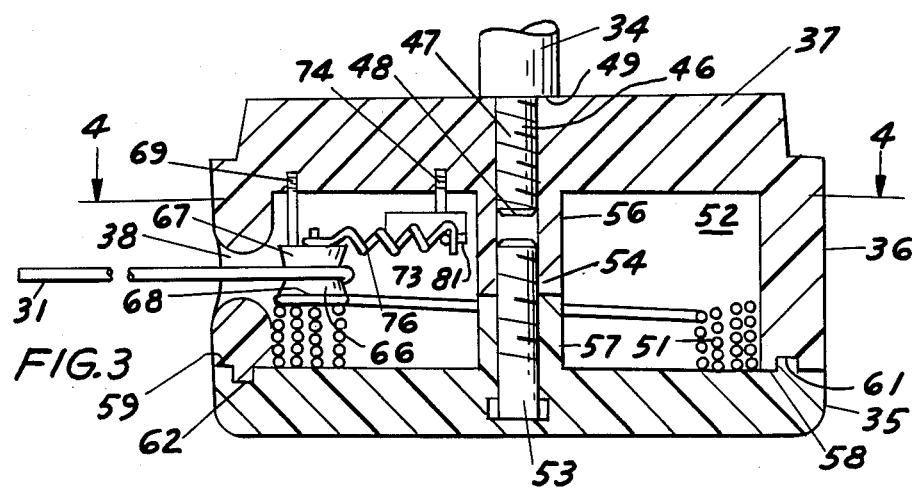
FIG.3

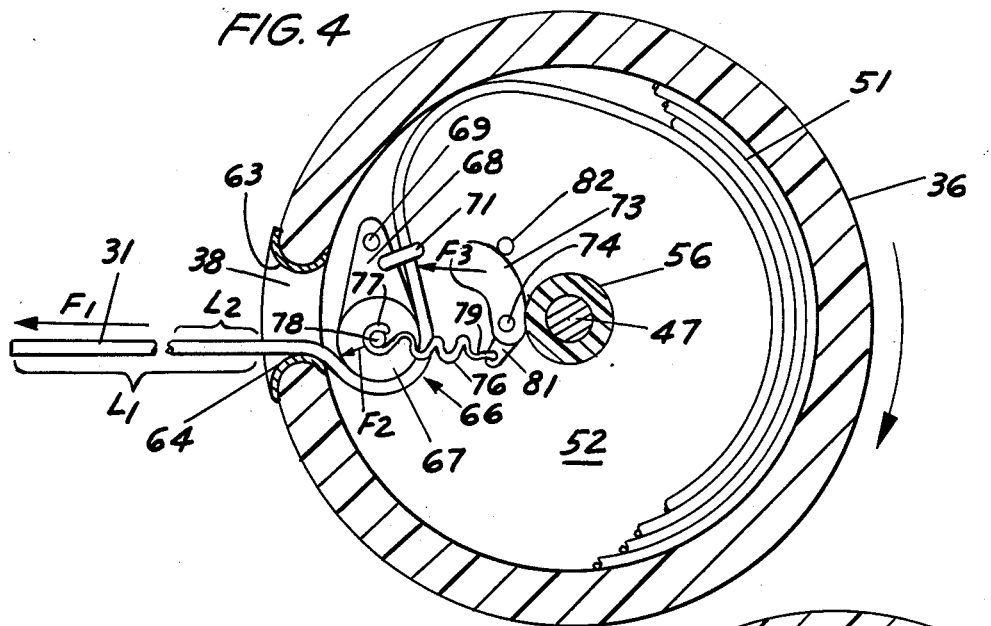
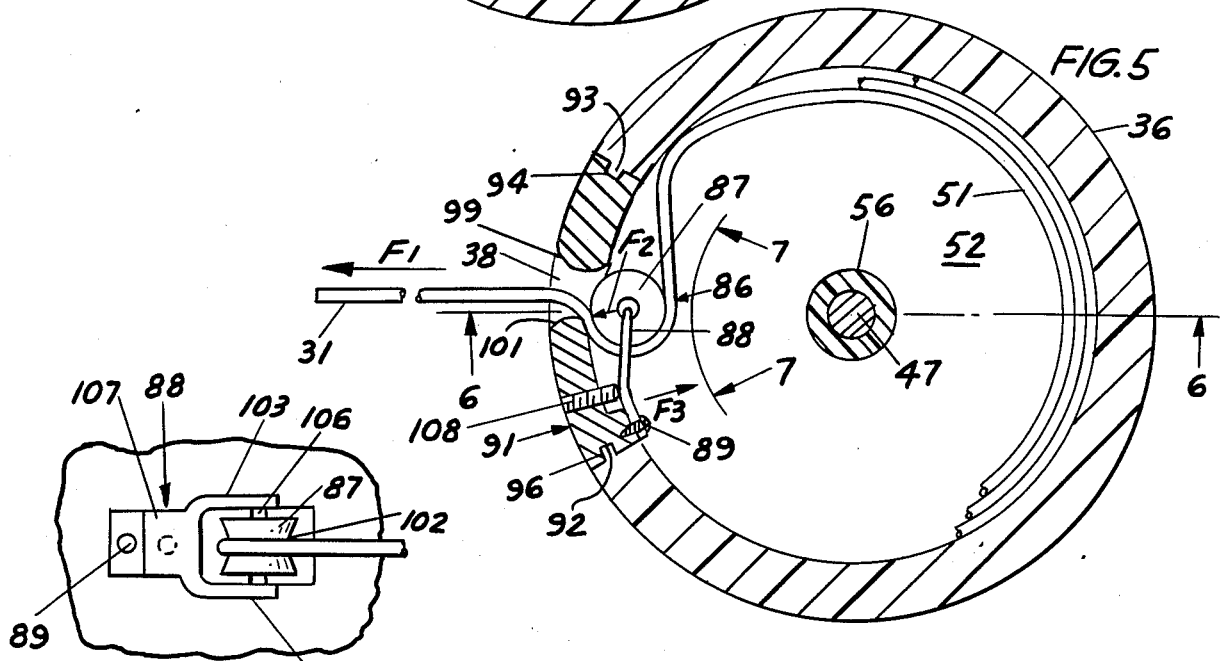
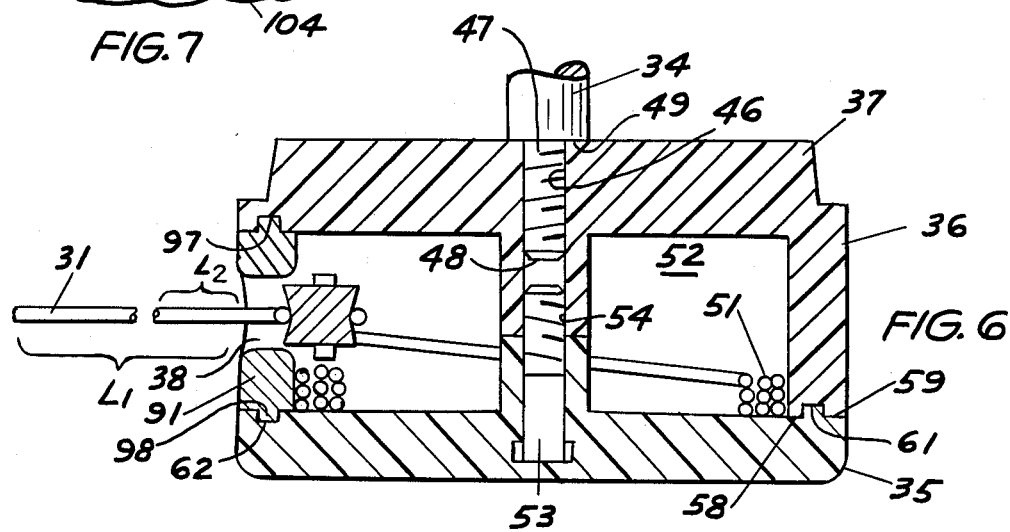

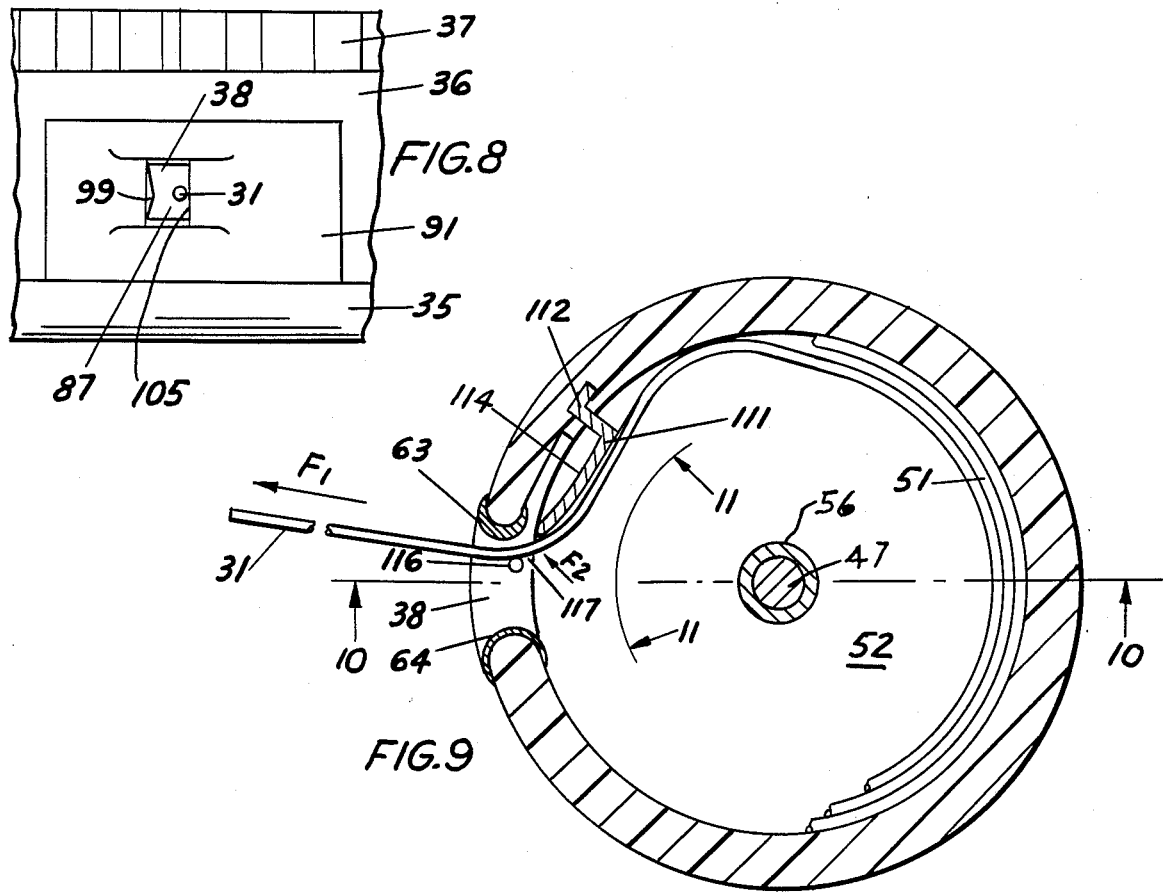
FIG. 8
FIG. 9
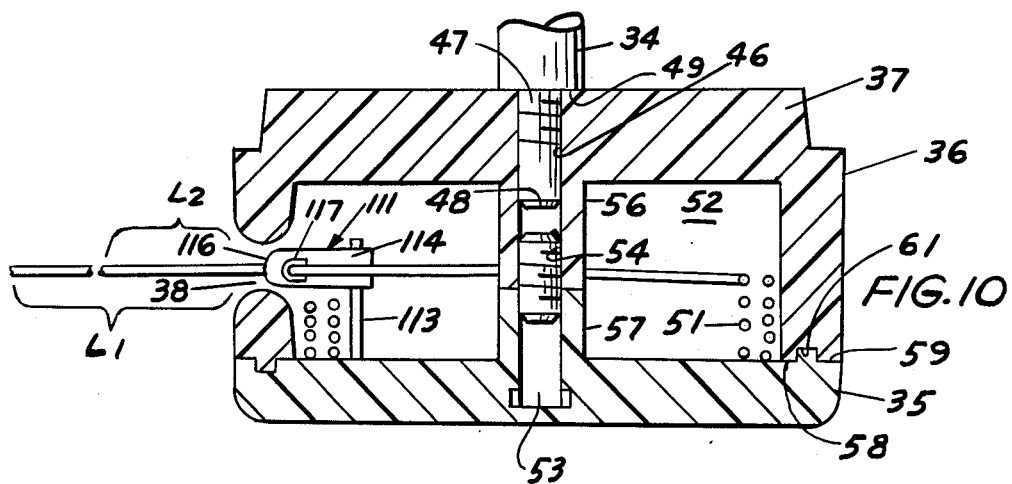
FIG. 10
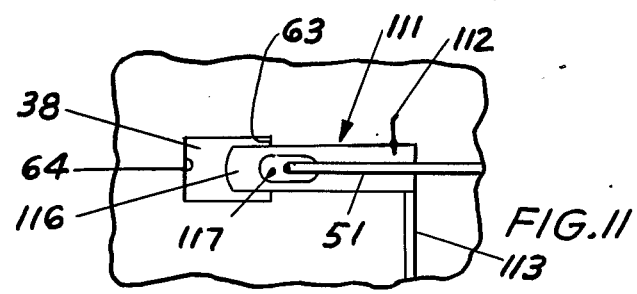
FIG. 11

APPARATUS FOR CUTTING VEGETATION

This application is a continuation of application Ser. No. 245,459, filed Mar. 19, 1981 which is a continuation of application Ser. No. 891,666 filed Mar. 30, 1978 now abandoned.

BACKGROUND OF THE INVENTION

1. Field of the Invention

This invention relates to the cutting vegetation, and more particularly, it relates to the cutting of vegetation using a flexible, non-metallic cutting line extending from a rotating head into a cutting plane.

2. Description of Prior Art

Various types of devices have been proposed for many years to facilitate the removal of vegetation by mowing, trimming, edging and like cutting operations. In general, these devices have employed a metal blade to effect vegetation removal. Devices of this nature employ prime movers such as electric and gasoline motors. As a result, rotating metal blades can inflict serious and terrible injury upon the user.

In about 1960, there was developed in Europe a trimmer/edger unit employing a flexible polymeric line extending from a rotating head for cutting vegetation. This unit did not work properly because of several defects in structure and operating parameters. In the United States of America, practical vegetation cutting devices using flexible, non-metallic lines carried upon a rotating head were developed. The devices are shown in U.S. Pat. Nos. 3,708,967, 3,826,068, 3,859,776, 4,035,912, 4,052,789, 4,054,992 and 4,067,108. These patented devices have met outstanding success in that these American developments provide safe electrical or gasoline-powered tools for vegetation cutting, edging and trimming operations.

The devices shown in these patents employ a flexible cutting line, such as manufactured from Nylon ® polymer. The cutting line is carried usually upon a spool internally of a rotating head. When desired to replenish the line or to extend an additional length of it, the rotation of the head was stopped and line manually extended from the spool. This line extension procedure in the patented devices has been found to be convenient, simple and reliable. In many of the more powerful devices, especially those powered by d.c. electric motors, a system to extend the cutting line from the head without interrupting cutting operations was desired.

A most desirable system would be capable of feeding cutting line from the head as needed and independent of operator action during grass cutting. Structures directed toward this purpose are shown in U.S. Pat. Nos. 3,895,440, 4,020,550 and 4,035,915. These structures have, in common, a basket weave supply of cutting line carried on the periphery of a disc with the line feeding from behind special post members. These post members have a cutting-abrading edge so that cutting line from the weave supply is bent about such edge in the free traveling end portion extending into the cutting plane. The combination function of the edge, line, angular speed, etc. is arranged so that the line posts with such edge sever the free end of the cutting line when it is worn to an ineffective length. In practice, these structures are found to waste about 25 percent of the cutting line because of the excessive length of line severed at the post's edge e.g. 3 inches.

The present invention provides a rotating head with a mechanism that extends the cutting line to its maximum preset length whenever it is worn to a predetermined lesser length and without interrupting vegetation cutting or independent operator action.

SUMMARY OF THE INVENTION

In accordance with this invention, there is provided an apparatus for cutting vegetation which has a head rotatable about an axis of rotation. The head carries in a cavity a supply of a flexible non-metallic cutting line. The cutting line extends outwardly from the head through an aperture into a cutting plane. A first means secures the cutting line to the head when its free end is at a predetermined length. A second means releases the cutting line for extending a certain discrete length into the cutting plane when the free end is decreased to a predetermined minimum length. A third means actuates the second means to extend the cutting line from the predetermined minimum to maximum lengths upon a change in one or more operative conditions in the rotating head. The certain descrete length is substantially equal in repeated cutting line extensions.

DISCRIPTION OF THE DRAWINGS

FIG. 1 is a pictorial view illustrating one embodiment of the apparatus for cutting vegetation arranged according to the present invention;

FIG. 2 illustrates in enlargement the lower portion of the apparatus shown in FIG. 1;

FIG. 3 is a vertical section, in enlargement, taken through the cutting head of the apparatus shown in FIG. 2;

FIG. 4 is a cross section of the cutting head as shown in FIG. 3 taken along line 4—4;

FIG. 5 is a cross section, in enlargement, through the cutting head shown in FIG. 2, but of a second embodiment of the present apparatus;

FIG. 6 is a vertical section through the cutting head shown in FIG. 5 taken along line 6—6;

FIG. 7 is a partial elevational view taken along line 7—7 in FIG. 5;

FIG. 8 is a partial elevation view taken exteriorly of the cutting head shown in FIG. 5 with the view aligned axially along the free end of the cutting line;

FIG. 9 is a cross section, in enlargement, through the cutting head shown in FIG. 2, but of a third embodiment of the present apparatus;

FIG. 10 is a vertical section taken along line 10—10 through the cutting head shown in FIG. 9;

FIG. 11 is a partial elevation view taken along line 11—11 in FIG. 9;

In these drawings, the several embodiments have common elements of construction in the cutting head. In regard to the several figures, like elements carry like numerals to simplify description of these embodiments in description of the present apparatus.

DESCRIPTION OF SPECIFIC EMBODIMENTS

Figure 12:
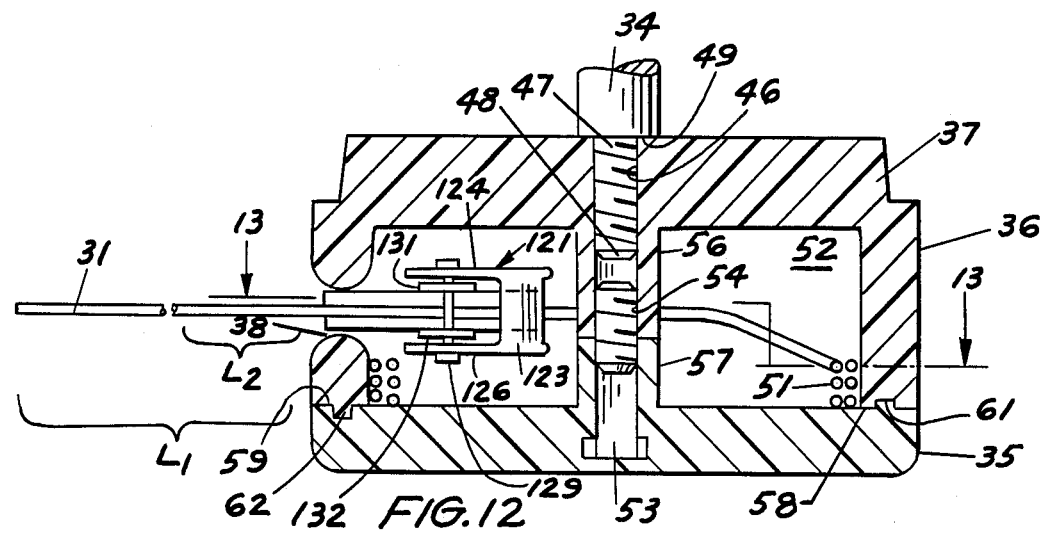
FIG. 12 is a vertical section, in enlargement, through the cutting head shown in FIG. 2, but of a fourth embodiment of the present apparatus.

Referring to FIG. 1 there is shown an apparatus for cutting vegetation, which is constructed in accordance with one embodiment of the present invention. In this particular embodiment, the apparatus is a grass trimmer 21, but it could be a lawnmower, edger or other device for vegetation cutting purposes. The trimmer 21 has a lower housing 22 interconnected by a tube 23 to a handle assembly 24. The assembly 24 provides a switch 26 for selectively applying electrical power received by a cord 27 to an electrical motor carried within the housing 22. For two-handed operation of the trimmer 21, an auxiliary handle 28 is provided upon the tube 23. The lower housing 22 carries a head 29 rotatable about an axis passing through the housing 22 and the cutting line 31 extends into a cutting plane which is substantially perpendicular to the axis of rotation of the head.

In FIG. 2, there is shown an enlargement of the housing 22 carrying a plurality of air induction openings 32. These opening introduce a flow of cooling air over the motor contained in the housing 22. The housing 22 includes an electric motor 33 which has a downwardly-extending drive shaft 34. The head 29 is threadedly connected to the shaft 34. The upper surface of the head 29 may be surrounded by a plurality of vanes 37 serving as a centrifugal blower for moving air radially outwardly from the head 29 during its rotation. As a result, the induced flow of air cools the motor 33 within the housing 22. The head 29 includes a hub 36 and a cover 35. The hub 36 carries in its side peripheral surface an aperture 38 through which the cutting line 31 extends radially outwardly into the cutting plane. A metal bearing surface at the aperture 38 protects the line 31 against undue wear and breakages. The cover 35 is releasably secured to the hub 36 by a threaded connection.

The housing 22 includes a rearwardly-extending tail part 42 which serves as a protection to the user to prevent inadvertent contact with the rotating cutting line 31. Also, the tail part provides an automatic limit to the extension of the cutting line 31 from the head 29. More particularly, the tail part 42 had a downwardly-extending projection 43 in which is embedded a metal cutting blade 44. As a result, the cutting line 31 rotated in a cutting plane by the head 29 can never have an operating length greater than the distance from the axis of rotation to the cutting blade 44. Any greater length of cutting line is automatically severed by the blade 44.

The head 29, as seen in FIGS. 3 and 4 is disc-like with a smooth peripheral side surface carrying the aperture 38 through which the cutting line 31 extends into the cutting plane. If more than one cutting line is used, each line should have a seperate aperture and bearing surface. The hub 36 on one face carries integrally adapter threads 46 in which the drive shaft 34 is secured by its threads 47. In addition, the adapter threads 46 extend axially a sufficient dimension in the head 29 to form a rigid and integral connection with the shaft 34. Preferably, the shaft 34 is cylindrical with a flat circular shoulder 49 above its lower terminus 48.

The hub 36 forms a cylindrical cavity 52 in cooperation with a cover 35. A supply 51 of coiled cutting line is disposed within the cavity 52. The coiled cutting line is free for independent rotational and axial movements within the head 29. If desired, the coiled cutting line can be carried on a spool mounted for rotation with the head.

The cover 35 carries integrally a stud 53 which is received within a threaded axial opening 54 on the hub 36. The hub and cover have meeting surfaces provided by posts 56 and 57, and annular abutting planar surfaces 58 and 59, respectively. One or more recesses 61 and pins 62 provide for angular alignment between the hub and cover. The cover is unthreaded for access to the cavity 52, preferably counterdirectionally to head rotation.

The interior end of the coiled cutting line is not secured to the hub 36. The free end of the cutting line 31 extends outwardly of the head 29 through the aperture 38. Preferably, the coiled cutting line supply 51 is wound counterdirectionally to the rotation of the head during vegetation cutting. This coiled line winding arrangement avoids backlash problems and unintended uncoiling of cutting line when rotation of the head is suddenly reduced.

The exposed surfaces of the head 29 should be smooth in surface contour, rounded at the edges and without substantial projections and recesses capable of trapping appreciable vegetation. Preferably, the cover 35 has a smooth exposed surface, is circular in configuration with rounded corners, and is positioned coaxially aligned with the axis of rotation of the head 29.

The aperture 38 has curved leading and trailing edges which encounter the cutting line 31 during head rotation. Preferably the leading and trailing edges carry metal bearing surfaces 63 and 64, respectively. The surfaces 63 and 64 are integral with the hub 36, but could be made removable as shown in FIGS. 5–8.

In each of the heads of the present invention, there is provided a mechanism for extending a certain discrete length of cutting line from the cavity 52 through the aperture 38 into the cutting plane surrounding the rotating head 29. The mechanism includes a first means for securing the cutting line 21 from extension through the aperture 38 into the cutting plane when the free end of the cutting line has a predetermined maximum length. This length is generally designated in the accompanying drawing by the reference $L_1$. A second means is included for releasing the cutting line for extending the certain discrete length through the aperture 38 whenever the free end of the cutting line has worn or decreased to a predetermined minimum length. This minimum length is generally designated by the reference character $L_2$. In addition, a third means is provided for actuating the second means so that the free end of the cutting line is extended by the certain discrete length from the predetermined minimum length $L_2$ to the predetermined maximum length $L_1$ upon sensing a change in one or more of the operative conditions of the head during its rotation in cutting vegetation. These conditions can be the angular velocity of the rotation head, a change in this angular velocity, the torque exerted upon the head during its rotation in cutting vegetation, or the centripetal force from the cutting line 31 at the head.

In FIGS. 3 and 4 there is shown a first embodiment of the head 29 arranged according to the present invention. The head 29 carries a cam lock 66 which provides the aforementioned functions of the mechanism for extending during cutting vegetation the certain discrete length of cutting line independently from operator action. The cam lock 66 includes a rotatable thimble 67 which is journaled to a subtended mounting bracket 68. The bracket 68 is mounted to a pin 69 which is carried by the hub 36. With this arrangement, the thimble 67 is free to rotate and to move toward and away from the surface 64 in response to the several forces acting upon it in the present head arrangement. The cutting line 31 extends from the supply 51 and through an eyelet 71 mounted upon the bracket 68. Thence, the cutting line extends about the medial portion of the thimble 67. The thimble may have a grooved periphery 72, but only of a slight recessed area so that the cutting line is engaged between the thimble 67 and the metal bearing surface 64 with sufficient force to regulate extension of the cutting line 31 into the cutting plane.

The swinging movement of the thimble 67 is controlled by two elements of the mentioned mechanism. In this regard, a weighted lever 73 is journaled to pivot on pin 74 carried by the hub 36. A helical spring 76 is secured at one eye 77 through a projecting pin 78 atop the thimble 67. The spring 76 has a second eye 79 which engages an ear 82 carried upon the lever 73 adjacent pin 74. A stop 82 regulates the inward movement of the lever 72 toward the motor shaft 34.

The operation of the cam lock 66 with its various elements is as follows. The line length $L_1$ of the cutting line generates a force $F_1$ when at its predetermined maximum length projecting into the cutting plane from the rotating 29. Whenever the cutting line is shortened, either by wear breakage or otherwise to a predetermined minimum length indicated by $L_2$, the cam lock 66 feeds the certain discrete increment of length to again bring the cutting line 31 to its original length $L_1$. In this embodiment, the cam lock 66 functions upon the difference in angular velocity of the head 29 with the cutting line at length $L_1$ and then again at $L_2$. With the motor 33 of a design providing relatively constant output torque on the motor shaft 34, the head 29 responds with an angular velocity representative of the extended lengths of the cutting line 31. For example, the cutting line 31 at length $L_1$ may induce the cutting head 29 to an angular velocity of 6,000 RPM. When the cutting line has been shortened to the length $L_2$, the angular velocity of the rotating head 29 may be 6,500 RPM. This difference in angular velocity is sensed by the cam lock 66 and will result in the feeding of the certain discrete increment of cutting line from the supply 51 through the aperture 38 so that the free end of the cutting line 31 is again at the length $L_1$.

For this purpose, the several elements of the cam lock 66 are arranged in a cooperative manner to produce the necessary functions for securing, releasing and actuating the cutting line extension from the rotating head. More particularly, the thimble 67 has a mass and a pivoted moment such that when the line 31 is at length $L_1$, it generates a force designated $F_2$ in the direction indicated by its arrow. This force is of sufficient magnitude to pinch the cutting line against the metal surface 64 and secure it from extension through the aperture 38. As the angular velocity of the rotating head begins to increase, the weight 73 begins moving away from the stop 82 with a force indicated as $F_3$ and in the direction shown by its arrow. At this time the spring 76 is being expanded radially but it does not significantly influence the force $F_2$ generated by the thimble 67 as a result of centrifugal force. However, as the angular velocity of the rotating head reached the value where the length of the cutting line reaches the length $L_2$, the pivoted weight 73 has elongated the spring 76 to its maximum elongation. As a result, the weight 73 overcomes substantially the centrifugal force $F_2$ holding the thimble 67 against the cutting line. Upon reaching the maximum angular velocity when the cutting line is at length $L_2$, the weight 73 as force $F_3$ pulls the thimble 67 away from the metal surface 64 sufficiently that cutting line is drawn from the head by centrifugal force until it reaches its predetermined maximum length $L_1$.

When the cutting line is extended to length $L_1$, the angular velocity of the rotating head is reduced. Again, the force $F_2$ of the thimble 67 becomes sufficient to pinch the cutting line against the metal surface 64 and secure it from further extension from the rotating head. Naturally, the elongation of the spring 76 is complemented by the movement of the pivoted weight 73. The cooperative elemental functions provide a snap-action extension of the cutting line by a certain discrete length from the aperture 38 into the cutting plane. However, the spring 76 may be so tailored to the movement of the weight 73 so that the elongation of the spring beings relatively quickly, but elongates more slowly as the line approaches its length $L_1$.

In this particular embodiment, when the head 29 is at rest, the centrifugal force $F_2$ is removed from the thimble 67. Now, the line 31 can be pulled manually from within the cavity 52 of the head. In contrast, when the head is rotating in normal cutting operation the forces $F_1$ and $F_3$ are balanced against the force $F_2$ so that the line 31 at length $L_1$ is secured against any extension from the rotating head. When the cutting line 31 is reduced to a length $L_2$, the forces $F_1$ and $F_3$ increase while the force $F_2$ remains substantially constant. At this time, the line 31 slides between the thimble 67 and the metal surface 64 until the line is again at length $L_1$ when the original force balance is again achieved.

In FIGS. 5-8, there is shown s second embodiment of the novel head of the present apparatus. In this embodiment, an alternative thimble-type cam lock is used. However, the cam lock 86 is arranged to be more compact and use fewer elements. In particular, the cam lock 86 has a rotating thimble 87 which is mounted upon a spring bracket 88. The spring bracket 88 is secured to the hub 36 by a screw 89 carried upon a metal insert 91. The metal insert 92 may be cast and has a substantially rectangular form. Side grooves 92 and 96 on the insert receive projections 94 and 96 carried upon the hub 36.

As best seen in FIGS. 5 and 6, the cover 35 is removed from the hub 36 and the metal insert 91 is slidably positioned into the corresponding opening provided in the hub. The insert 91 is also aligned vertically by a groove and a pin arrangement 97 and 98. With this arrangement, the insert 91 is installed into the hub 36 and the cover 35 threadly mounted thereon to secure the insert in operative position during head rotation. The aperture 38 is formed within the insert. Also, the metal insert carries curved leading and trailing edges adjacent the aperture 3. The leading and trailing edges 99 and 101 protect the cutting line as it passes through the aperture 38 against abrasion and other vibratory induced damage during cutting operations. Referring momentarily to FIG. 8 the particular arrangement of these various elements can be seen in greater detail.

The arrangement of the spring bracket 88 is mounting the thimble 87 can best be seen by reference to FIG. 7. The thimble 87 may carry an annular groove 102 as a very slight depression to help maintain the cutting line 31 in position within the aperture 38. The spring bracket 88 has an end pair of arms 103 and 104 which carry a pin 106 passing through the thimble 87 and serving as a journal mount for it. The body portion 107 of the spring bracket 88 is formed as a flat spring and serves at least two important functions. First, the spring bracket 88 serves to mount and journal the thimble 87 in operative position. In addition, the spring bracket 88 provides a biasing force to the oppose movement of the thimble 87 towards the surface 101 as a result of centrifugal force. With this arrangement, an adjusting screw 108 is provided within the metal insert 91 to engage medially the spring bracket 88 and provide for adjusting its tensioning effect upon the thimble 87. As described before the force $F_1$ indicates the centrifugal force exerted by the cutting line 31 when at its extended length $L_1$. The thimble 87 provides a substantially constant centrifugal force $F_2$ directed towards the surface 101 so as to pinch the cutting line 31 sufficiently at its length $L_1$ to prevent extension from the rotating head 29. The spring bracket 88 and adjusting screw 101 function to extend a certain discrete length of the cutting line 31 when shortened to a predetermined minimum length $L_2$. At this time the angular velocity of the cutting head 29 increases so that the force $F_1$ of the shortened cutting line $L_2$ in conjunction with the counter biasing force $F_3$ of the spring bracket 88 opposes the force $F_2$ of the thimble 87. Now, the cutting line passes about the thimble and out of the aperture 38 until the cutting line again reaches its predetermined maximum length $L_1$. At this time the original force arrangement reestablishes and secured the cutting line to the head 29 against unintended extension.

With the cutting head at rest the spring bracket 88 exerts sufficient force upon the thimble 87 that cutting line 31 may be withdrawn from the supply 51 into the cutting plane. In addition, the arrangement of the spring bracket 88 and the other portions of the cam lock 86 are such that the line only begins to feed when it reaches reduced length $L_2$. At this time, the line begins to extend smoothly until reaching the predetermined maximum length $L_1$ when it is again secured to the rotating head.

Referring now to FIGS. 9, 10, and 11, a third embodiment of the present invention will be described which has been reduced to a simplified element grouping, but yet provides a controlled line extending function. In this third embodiment, the cutting line control mechanism is provided by a single multifunction element which may take the form of a spring snubber 111. The spring snubber is an elongate resilient spring member having at one end an offset "ell" portion 112. The portion 112 is slidably received within a correspondingly shaped groove 113 formed within the hub 36. With the cover 35 removed, the spring snubber 111 is slid axially upwardly into groove 113 to its operative position. The portion 112 is secured within the grove, such as by an adhesive or thermal sealed depression. The spring snubber 111 has a medial portion 114 which extends angularly toward the aperture 38. The free end 116 of the spring snubber 111 contains a round edged opening 117 through which the cutting line passes from the supply 51 and outwardly of the aperture 38 into the cutting plane surrounding the rotating head 29.

Referring more particularly to FIG. 11, the construction of the spring snubber 111 maybe seen in greater detail. The free end 116 resides immediately adjacent the metal surface 63 encircling the leading edge portion of the aperture 38. The medial portion 114 of the spring snubber 111 is adjusted both in tension and position during manufacture so that, when the head is at rest, the line 31 can be pulled easily from the head by the operator. However, when the head is rotating at an angular velocity representative of the cutting line having its fully extended predetermined maximum length $L_1$, then the for $F_1$ of the cutting line acting upon the medial portion 114 and the centrifugal force $F_2$ acting upon the spring snubber 111 cause the cutting line to be pinched between the free end 116 and the surface 63 and thereby be secured against extension from the rotating head. Whenever the cutting line 31 is shortened by wear or for other reasons, to the predetermined minimum length $L_2$, the spring snubber reacts along the curved portion 114 as a result of the counter biasing force $F_3$ so as to overcome the combination of the forces $F_1$ and $F_2$ and free end 116 moves away from surface 63. As a result, the cutting line 31 extends smoothly outwardly through the aperture 38 until it reaches its predetermined maximum length $L_1$. At this time, the centrifugal force $F_1$ of the cutting line 31 in conjunction with the centrifugal force $F_2$ acting upon free end 116 of the spring snubber are sufficient to pinch the line against the surface 63 and secure it from further extension from the head 29. This embodiment employing the spring snubber 111 has an operating characteristic much like the spring-carried thimble 87 of the embodiments described in FIGS. 5-8, but with a much simpler construction.

If desired, the spring snubber 111 can be provided with a longitudinal groove, much like a venetian blind, so that the element has a snap action type operation. With such a groove in the medial portion 114, the control of extension of the cutting line from length $L_2$ to length $L_1$ will occur with a sudden snap action. Depending upon the preference of the operator, this particular embodiment may be arranged to give either result without substantial difficulty in arrangement of the spring snubber 111.

Figure 13:
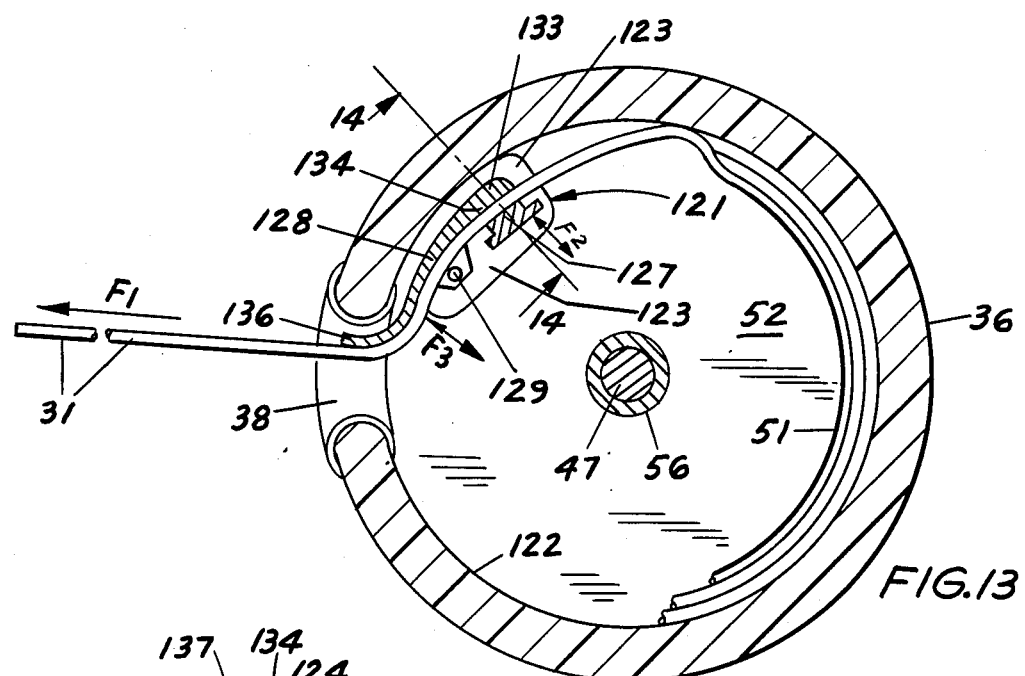
FIG. 13 is a cross section taken along line 13—13 through the cutting head shown in FIG. 12.
Figure 14:
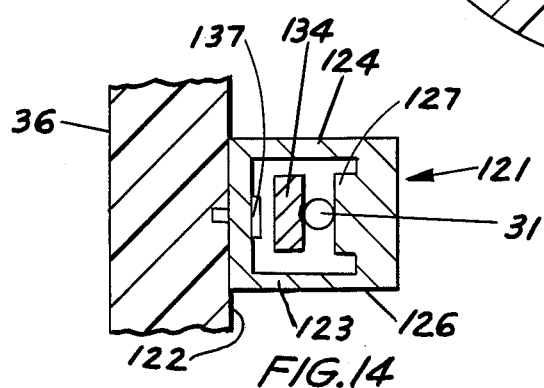
FIG. 14 is a partial vertical section enlarged to twice scale, taken along line 14—14 of the cutting head shown in FIG. 13.

Referring now to FIGS. 12-14, there is shown a fourth embodiment of the present invention having much the same characteristics in operation as the previous embodiments, but with a very simple and easily constructed form which may be mounted into any type of an existing head arrangement. In this particular construction, the cam lock 121 is formed of a unitary or modular construction which can be readily secured to the inner wall 122 of the head 29. The cam lock is formed of a base member 123 which carries top and bottom flanges 124 and 126. The base member 123 also carries a fixed jaw 127 which extends vertically between the flanges and for a short lateral distance along the base member. A lever 128 is pivotedly mounted by a pin 129 between upper and lower ears 131 and 132 to the base member 123. The lever at its inward end 133 carries a jaw 134 which is adapted to cooperate with the jaw 127 for gripping or pinching the line 31 for controlling its extension from the rotating head. The lever 128 has a free end 136 within the aperture 38. The end 136 is formed with a curved surface to support the cutting line 31 during cutting operations and prevent it from being injured or broken by encountering a solid unyielding object. Preferably, the lever 128 is of a metal such as brass or steel and may be formed by investment casting.

Referring momentarily to FIG. 14, the base member is secured to the inner wall 122 of the hub 36 by a screw or self tapping pin 137.

In particular, the lever 128 is provided with mass distribution at its ends 133 and 138 to produce a balancing of the respective forced $F_1$, $F_2$, and $F_3$. When the cutting line 31 is at its predetermined maximum extension $L_1$ from the head 31, the force $F_3$ is sufficient to move the pivoted lever 128 so that the jaw 134 moves toward the jaw 127 with sufficient force to pinch or engage the cutting line and hold it securely against extension from the rotating head. As the cutting line is decreased to length $L_2$ through wear or for other reasons, the mass of distribution of the lever 128 is such that the force $F_3$ remains relatively constant while the force $F_2$ acts against force $F_1$ to open the jaws 127 and 134 sufficiently that the cutting line may be extended through the jaws and out the aperture from the head.

In this particular embodiment, the force $F_3$ is a composite of a relatively fixed centrifugal force plus the pull of the cutting line 31 represented by the force $F_1$ acting upon the curved tip 136 of the lever 128. As a result, a turning moment acting upon the lever 128 urges the jaws 127 and 134 towards each other with proper engagement of the cutting line to secure to the head at cutting line length $L_1$. Whenever the angular velocity of the head increased (e.g. from 6,000 to 6,500 RPM) when the line is reduced to length $L_2$, the centrifugal force $F_3$ remains relatively constant. However, the forces $F_1$ and $F_2$ are correspondingly decreased. Since these forces $F_1$ and $F_2$ are on oposite sides of a pivot they tend to reinforce each other in the total change of force. Therefore, the jaws will open to permit the line to pass through them into the cutting plane. Since the lever 128 is a balanced mass actuator, the line remains secured until it reaches the reduced length $L_2$. Then, the line will be extended a certain discrete length to its length $L_1$ rather quickly. In this balanced force manner, the cam lock 121 will not hunt or allow the line to slip but rather will feed positively the cutting line 31 under complete control from the length $L_2$ to the length $L_1$ in response to its sensing the angular velocity of the rotating head.

Although there has been described a particular arrangement of functions and elements in the various mechanisms employed in the head of the present invention, it is not intended that this description is the only possible arrangement of these elements to produce the results of the invention. In this regard, the functions and elements may be altered to produce the same results. All that is required for these elements is a mechanism which secured the line 31 from extension when at the predetermined maximum length $L_1$ in the cutting plane. Also, the mechanism releases the cutting line when the cutting line length has been reduced to the predetermined shorter length $L_2$. In addition, the mechanism provides for actuating the extension of the cutting line at its free end from the predetermined minimum length $L_2$ to the predetermined maximum length $L_1$ upon sensing a change in one or more of the operating conditions of the rotating head.

From the foregoing, it will be apparent that there has been provided a novel apparatus for cutting vegetation which provides a convention and safe means for extending cutting line without the individual attention of the operator. It will be appreciated that certain changes or alterations in the present apparatus may be made without departing from the spirit of this invention. These changes are contemplated by and are within the scope of the apended claims which define the invention. Additionally, the present description is intended to be taken as an illustration of this invention.

What is claimed is:

1. Apparatus for cutting vegetation comprising:
a head rotatable about an axis of rotation, said head having at least one aperture and a cavity for storing a relatively long length of flexible cutting line;
drive means capable when operative of effecting rotation of said head;
a quantity of flexible cutting line disposed in said cavity and having a free end extending outwardly from said head through said aperture into a cutting plane; and
feed effective means operable in response to a shortening of said free end during rotation of said head to enable additional cutting line to be released through said aperture to restore the length of said free end.

2. The apparatus set forth in claim 1 wherein:
said feed effective means comprises a member mounted on said head for movement to secure said line against extension into said cutting plane at a first speed of rotation of said head, said member being responsive to said head increasing to a second speed of rotation greater than said first speed to release said cutting line to permit extension of said cutting line into said cutting plane.

3. The apparatus set forth in claim 1 wherein:
said feed effective means comprises a cam member mounted on said head for securing said cutting line against extension into said cutting plane, said cam member being movable in response to a shortening of said free end in said cutting plane to release said cutting line for extension into said cutting plane.

4. The apparatus set forth in claim 3 wherein:
said cam member includes a portion engageable with said cutting line between said free end and said length stored in said cavity for pinching said cutting line against a cooperating surface on said head to prevent extension of said cutting line into said cutting plane.

5. The apparatus set forth in claim 4 wherein:
said feed effective means includes means for biasing said cam member away from said surface to permit extension of cutting line into said cutting plane under the urging of a centrifugal force acting on said free end.

6. The apparatus set forth in claim 5 wherein:
said feed effective means for biasing said cam member includes a second member movable in response to a centrifugal force acting thereon to move said cam member away from said surface.

7. The apparatus set forth in claim 3 wherein:
said cam member is partially encircled by said cutting line, and is cooperable with an abutment on said head whereby said cutting line is secured in a curved portion therebetween.

8. The apparatus set forth in claim 3 wherein:
said cam member is a cylindrical roller supported for movement toward and away from a surface on said head adjacent said aperture whereby centrifugal force imposed on said roller at a first angular velocity of said head secures said cutting line against extension of its free end into said cutting plane, and said feed effective means includes a spring member secured to said roller for urging said roller away from said surface and operable at an increase in said angular velocity to release and effect movement of said cutting line through said aperture in response to shortening of said free end.

9. The apparatus set forth in claim 8 wherein:
said spring member interconnects said roller to said head through a weight displaceably responsive to the forces of rotation to exert a relatively sudden increase in spring force on said roller to separate said roller from said surface upon the angular velocity of said head increasing to a predetermined value.

10. The apparatus set forth in claim 9 wherein:
said spring member is a helical spring extending generally radially in said head.

11. The apparatus set forth in claim 9 wherein:
said spring member is a leaf spring secured at one end to said head.

12. The apparatus set forth in claim 3 wherein:
said cam member includes an elongate flat spring member secured at one end to said head and extending laterally to a terminal portion adapted to move toward and from said abutment, said terminal portion having a round edged opening provided therein traversed by said cutting line extending through said aperture into said cutting plane, said terminal portion at a first angular velocity of said head moving toward said abutment to securely embrace said cutting line therebetween and said terminal portion moving away from said abutment to release said cutting line for extension into the cutting plane at a greater angular velocity of said head.

13. The apparatus set forth in claim 12 wherein:
said round edged opening is elongated longitudinally of said spring member and said cutting line therein is extended diagonally through said opening.

14. The apparatus set forth in claim 12 wherein:
said cutting line is held between said spring member and said abutment in an angular disposition less than right angles.

15. The apparatus set forth in claim 3 wherein:
said cam member comprises an elongated lever pivotally mounted on said head and having a curved portion extending toward said aperture to form a curved surface engaged by said cutting line during rotation of said head, said lever having an end jaw portion remote from said curved portion, an abutment mounted to said head and positioned to be engaged by said jaw portion when said lever is pivoted upon movement of its curved portion radially outwardly, said cutting line being engaged between said jaw portion and said abutment and secured against extension into said cutting plane during rotation of said head at a first angular velocity;
biasing means provided at least in part by said cutting line for separating said jaw portion and said abutment whereby said cutting line is released from said head; and
said lever adjacent said jaw portion having sufficient mass to reinforce said biasing means during rotation of said head at an angular velocity of predetermined magnitude greater than said first angular velocity whereby said cutting line is extended from a certain minimum length to a certain maximum length in said free end traversing the cutting plane during head rotation.

16. Apparatus for cutting vegetation comprising:
a head rotatable about an axis of rotation, said head having store means for storing a relatively long length of flexible cutting line;
drive means capable when operative of effecting rotation of said head;
a quantity of flexible cutting line disposed in said store means for storing and having a free and extending outwardly from said head into a cutting plane; and
control means including centrifugal force responsive means responding to a change in centrifugal force encountered by said head for enabling the length of said free en to increase when the rotational speed of said head exceeds a selected speed.

17. The apparatus set forth in claim 16 wherein:
said head includes feed effective means for restraining said cutting line to prevent extension of said free end when said free end is at a first predetermined length; and
said centrifugal force responsive means includes a member mounted on said head and responsive to an increase in the rotational speed of said head to relieve the restraint imposed by said restraining means to provide for extension of cutting line into said cutting plane.

18. Apparatus for cutting vegetation comprising:
a head rotatable about an axis of rotation;
drive means capable when operative of effecting rotation of said head;
store means for storing a relatively long length of flexible cutting line;
a quantity of flexible cutting line disposed in said store means for storing and having a free end extending outwardly from said head into a cutting plane; and
means responsive to a change in rotational speed of said head during rotation about said axis for extending said cutting line into said cutting plane.

19. Apparatus for cutting vegetation comprising:
a head rotatably about an axis of rotation;
drive means capable when operative of effecting rotation of said head;
store means for storing a relatively long length of flexible cutting line;
a quantity of flexible cutting line disposed in said store means with a free end extending outwardly from said head into a cutting plane;
means for restraining said cutting line from advancing into said cutting plane when said cutting line is at a predetermined length in said cutting plane during rotation of said head; and
means operable in response to a shortening of said free end of said cutting line during rotation of said head for causing said restraining means to release said cutting line for advancement into said cutting plane.

20. Apparatus for cutting vegetation comprising:
a long length of flexible cord stored coiled and unmounted in a rotating head of said apparatus and having a free end passing from said head through an eye;
a snubbing device for said cord, said snubbing device having a fixed part on said head and a moving part constrained to move toward and away from said fixed part;
a guideway for training said cord between said fixed part and said moving part and in at least a partial curve around a portion of said moving part and thence essentially radially outward through said eye;
said curve of said cord being so directed that tension caused by centrifugal force on said cord presses said moving part toward said fixed part; and means for biasing said moving part away from said fixed part with a force less than the maximum centrifugal force acting on said cord.

21. The apparatus set forth in claim 20, including:
means for biasing said moving part away from said fixed part with a force less than the maximum centrifugal force acting on said cord.

22. The apparatus set forth in claim 21, wherein:
said moving part of said snubbing device includes a grooved pulley around which the cord is passed and said fixed part includes a friction block for forcing said pulley to engage said cord.

23. The apparatus set forth in claim 22, wherein:
said biasing means is a spring.

24. The apparatus set forth in claim 20, wherein:
said moving part of said snubbing device is pivoted on an axis parallel to the axis of rotation of said head and is so located with respect to its pivot axis that is inertia during starting acceleration increased the pressure between the two parts of said snubbing device.

25. The apparatus set forth in claim 24, wherein:
said moving part of said snubbing device includes a grooved pulley around which said cord is passed and said fixed part includes a friction block for forcing said pulley to engage said cord, and said biasing means acting on said moving part is a spring.

26. The apparatus set forth in claim 25, including:
means responsive to positive and negative rotational acceleration for restraining said cord from moving in response to its centrifugal force.

27. The apparatus set forth in claim 20, including:
means responsive to positive and negative rotational acceleration for restraining said cord from moving in response to its centrifugal force.

* * * * *